United States Patent [19]
Vinsani

[11] 3,821,645
[45] June 28, 1974

[54] DEVICE FOR TESTING THE OPERATION OF SEQUENTIAL INTEGRATED CIRCUITAL UNITS

[75] Inventor: Mario Vinsani, Milan, Italy

[73] Assignee: Honeywell Information Systems Italia, Caluso, Italy

[22] Filed: Mar. 13, 1973

[21] Appl. No.: 340,798

[30] Foreign Application Priority Data
Mar. 17, 1972   Italy................................ 21989/72

[52] U.S. Cl......................... 324/73 R, 235/153 AC
[51] Int. Cl............................................ G01r 15/12
[58] Field of Search ........ 324/73 R, 73 AT, 73 PC; 235/153 AC

[56] References Cited
UNITED STATES PATENTS

| | | | |
|---|---|---|---|
| 3,286,175 | 11/1966 | Gerbier | 324/73 R |
| 3,311,890 | 3/1967 | Waaben | 324/73 R |
| 3,544,777 | 12/1970 | Winkler | 235/153 AC |
| 3,614,608 | 10/1971 | Giedd | 324/73 R |
| 3,735,105 | 5/1973 | Maley | 324/73 R |

OTHER PUBLICATIONS

Y. Tsuboi – Function Tester For Digital Integrated Circuits – Electrical Engineering in Japan – 89(8)–Aug. 1969 – pp. 45–54.

Primary Examiner—Michael J. Lynch
Attorney, Agent, or Firm—Fred Jacob

[57] ABSTRACT

A device is provided for testing integrated circuit units, the device including means for connecting the unit under test and comparing the outgoing signal of the unit with the outgoing signal of a reference unit to detect a difference in the logic operation of the unit under test and to determine failures. In order for such comparison to be accomplished, the reference unit is placed in the same state in which the unit under test should be for correct operation. The present device is advantageously employed in testing those units having circuit elements capable of assuring one of two definite states, and remaining in that state for an indefinite length of time.

5 Claims, 9 Drawing Figures

FIG.4a SUPERVISION CIRCUIT

FIG.6

DEVICE FOR TESTING THE OPERATION OF SEQUENTIAL INTEGRATED CIRCUIT UNITS

BACKGROUND OF THE INVENTION

This Application relates to a device for testing the operation of integrated circuit units as used in electronic data processing apparatus, and more particularly is an improvement to the copending U.S. Pat. Application Ser. No. 233,675, filed Oct. 3, 1972.

Said copending application describes a device comprising means for connecting the input pins of a reference integrated circuital unit, to the input pins of an integrated unit under test, and for comparing the signals at the output pins of the unit under test to the signals at the output pins of the reference unit, in order to detect any difference in the behaviour of the unit under test from that of the reference unit, and therefore any malfunction of the unit under test.

However the unit to be tested may not be of purely combinatorial type, but may comprise sequential, or memory elements, that is, circuit elements capable of assuming one of two definite states, and remaining in the assumed state for an indefinite length of time, thus storing an information element. In this case, as explained in the cited copending application, it is necessary, both in the unit under test, and in the reference unit, to initially set the sequential elements in the same state, so that they may respond in the same way to the received signals.

Different ways for obtaining this result have been indicated in the cited copending application. In the case where the integrated sequential unit to be tested is provided with a re-set input, that is, an input enabling a reset signal to set all the sequential elements in the same state, the desired result may be obtained by a key or a push button enabling the operator to send this reset signal; or alternatively, this signal may be generated in the test program, or also be emitted automatically by the apparatus at the start of the operation.

If the integrated sequential unit under test is not provided with such reset input, the same result may be obtained by a properly designed test program. The device according to the invention will be provided with an inhibit circuit, for preventing an error signal from being emitted as long as the test program has not yet set all the memory elements contained in the unit, in the same state. When this condition has been reached, the program may signal the operator, for instance by stopping, to disable the inhibit circuit.

The said means for reaching the required result are all feasible, but such arrangements lack generality, because they require a different designing of the test program, and a different behaviour of the operator, according to the type of unit to be tested.

The purpose of the invention is to provide means for automatically inhibiting the emission of the error signal as long as all the memory elements in the unit under test, and in the reference unit, have not been set in the same state, and for removing the inhibition when this condition has been reached.

Thus, there is no need for using an expressly designed test program, but a usual operating program of the apparatus may be used, provided it fulfills certain requirements. These means will adapt themselves to the type of unit to be tested, and therefore the manual operation to be effected by changing the reference unit will also adapt or change said means according to the type of reference unit.

SUMMARY OF THE INVENTION

This objective is attained by providing the testing device with circuit means for inhibiting the error signal, and associating with the reference unit a supervision circuit which, in the initial state, maintains the inhibition, and on receiving the signals applied to at least a part of the input leads of the reference unit, records these signals in storage elements, in such a way, as to remove said inhibition only in case the received signals have been such as to put each memory element of the reference unit in the same state in which the memory elements of the unit under test should be in case of its correct operation.

In the preferred embodiment, as described in the cited copending application, the supervision circuit is mounted on the same removable pin support which carries the reference unit. Therefore, by changing the support in order to change the reference unit mounted on the same, the supervision circuit is also changed accordingly.

BRIEF DESCRIPTION OF THE DRAWING

A preferred embodiment of the invention is now described in detail, with reference to the attached drawing, in which.

DESCRIPTION OF THE PREFERRED EMBODIMENT

Figure 1:
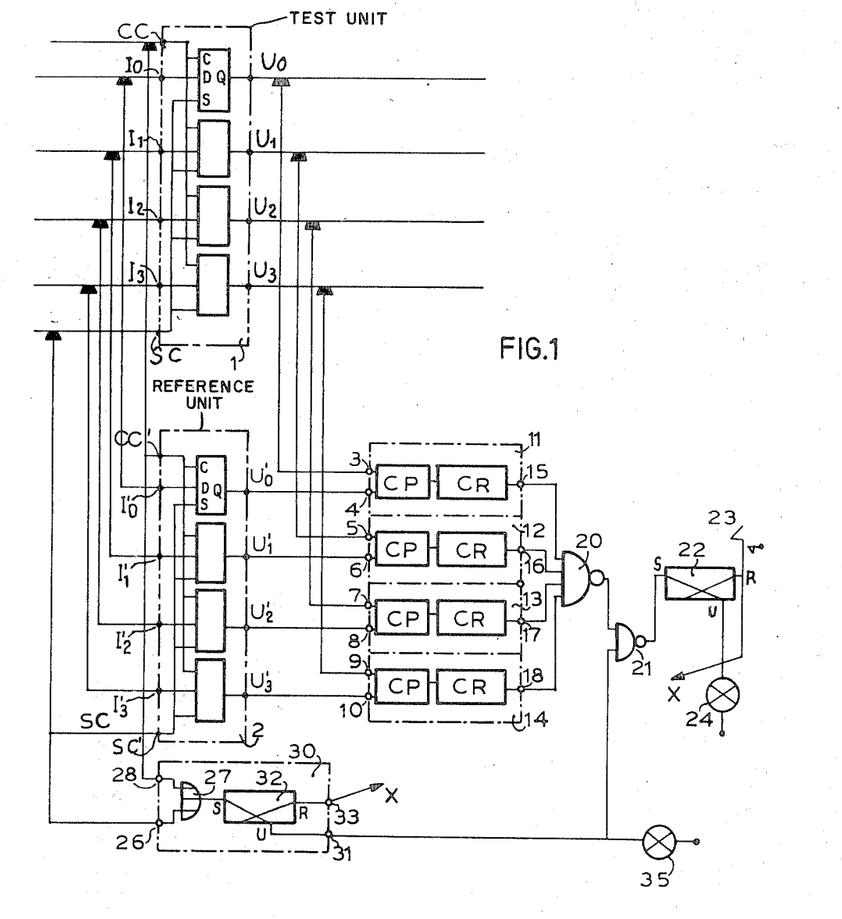
FIG. 1 is a simplified wiring diagram of the device according to the invention, in the case where the sequential unit is provided with clock and reset inputs.

FIG. 1 shows an example of the circuit according to the invention, applied to the device for checking the logical operation of an integrated circuit unit as described in the cited copending application.

Reference numeral 1 indicates the integrated sequential unit under test, which, in the example illustrated, comprises four bistable multivibrators with clock latching, usually known as a "Flip-flop-latch." Such devices each comprise a data input D, a clock input C, a set input S, and an output Q. The binary value applied to the input D is transferred to the output Q when, for instance, the input C is at value ZERO: when C goes from ZERO to ONE, the output value is latched to the input value existing immediately before the moment of this change of the clock value, and is independent of the value at the input D, as long as C remains ONE.

A binary value ONE applied to the set input S sets the flip-flop to a predetermined state, for instance the "high" state corresponding to the value ONE at output Q, independently of the values applied to the other inputs.

The integrated sequential unit illustrated in the example comprises four flip-flops of said type all having clock inputs and, respectively, all having set inputs connected to single respective common clock and common set inputs. It has, therefore, a Common Clock input CC, a Common Set input SC, four individual data input $I_0, I_1, I_2, I_3$ and four individual outputs $U_0, U_1, U_2, U_3$.

Reference numeral 2 indicates the sequential integrated reference unit, identical in construction and operation to the unit under test, and having the six inputs CC', $I'_0, I'_1, I'_2, I'_3$, SC' parallel connected to the six inputs CC, $I_0, I_1, I_2, I_3$, SC of the unit under test, by means of gripper contacts as described in the copending application.

The outputs $U'_0, U'_1, U'_2, U'_3$ of the reference unit are each connected to a first input, indicated respectively by 4, 6, 8, 10 of one of the logic test channels 11, 12, 13, 14, and the second inputs of these, respectively 3, 5, 7, 9 are connected, by means of the gripper contacts, to the outputs $U_0, U_1, U_2, U_3$, of the unit under test. Each one of the test channels comprises a comparing circuit CP and a delay circuit CR. As explained in more detail by the cited copending application, the comparing circuit gives at its output a signal of a given binary value, for instance ZERO, each time its two inputs are at a different binary value. The delay circuit OR may be formed by a delay line and an associated logic circuit, and at the output of the channel (respectively 15, 16, 17, 18) gives a signal of a given binary value, for instance ZERO, if, and only if, the length of the signal ZERO applied at its input by the comparing circuit is greater than a given interval. The presence of a binary value ZERO at the output of a logic test channel indicates therefore that there is a difference in binary values between the outputs U and U' of the corresponding pair of associated outputs of the unit under test and of the reference unit, and that such difference is not due to an allowed small difference in the propagation time of the signals within said units, but to a defective unit, and is therefore an error signal.

The outputs 15, 16, 17, 18 of the four test channels 11, 12, 13, 14 are connected to the inputs of a NAND gate 20 which therefore gives at its output a binary value ONE if, and only if, at least one of the inputs is a ZERO value, that is, if at least one of the channels emits an error signal.

The output of the NAND gate 20 is connected to a first input of a NAND gate 21, the second input being connected to a supervision circuit 30, associated with the reference unit 2.

The output 31 of this supervision circuit, the operation of which is described later in the description, delivers in the initial condition, a binary value ZERO. Therefore, the output of NAND gate 21 is ONE for any value of the signal at its first input. When the value of output 31 is ONE, the output of the gate 21 is the inverted value of the signal applied to its first input, connected to the output of gate 20.

In case it gives out a ONE signal, that is an error signal, this causes the output of NAND gate 21 to go to the value ZERO. This signal is applied to an input S of a flip-flop 22 setting the same in the "high" condition and originating a continuous alarm signal, for instance the lighting of the signalling lamp 24.

This light alarm may be turned off acting on the pushbutton 23 applied to a reset input R of the flip-flop 22. It may therefore be seen that a signal ZERO on output 31 inhibits the alarm signal caused by a difference of logical level between an output of the unit under test and the corresponding output of the reference unit.

Generally, the supervision circuit 30 is so designed, and so connected, as to give out at its output 31, initially, a ZERO value, and to change over to a value ONE only when both memory elements of each pair of corresponding elements in the unit under test and in the reference unit, have been put in the same state. From this moment on, all pairs of elements will change in the same way in response to the same signals, and therefore the testing of the unit under test may proceed in a fully automatic way, and is able to detect any fault under the condition that the program controlling the unit test be such, as to cause, in a first time, the coincidence of states for all pairs of corresponding memory elements in both units, and subsequently, to apply to the inputs of said units a sequence of signal patterns capable of revealing a faulty operation of the unit under test.

In the example considered, the sequential unit under test is provided with a common set input SC and a common Clock input CC. By applying a signal ONE to the common set input SC, all four flip-flops are brought, for instance, to the "high" position. When a signal ONE is applied to the common clock input CC, the four flip-flops of each unit are brought to the state determined by the values of the signals applied to the inputs I, which are the same for both units. Therefore, when a Clock signal, or a Set signal is applied to the corresponding inputs, all the corresponding flip-flops in both units are set in the same state, provided that the unit under test is operating correctly.

According to the preferred embodiment, therefore, in this case the supervision circuit 30 has two inputs, 28 and 29, connected to the common clock input CC' and to the common set input SC of the reference unit. These inputs are connected to the inputs of an OR gate 27, its output being connected to the set input S of a flip-flop 32 having a direct output U and a reset input R.

In the initial condition, the output U of flip-flop 32 delivers a ZERO value signal to the output 31 of the supervision circuit, and therefore the NAND gate is inhibited, and any alarm signal is prevented. When a signal ONE is present either at the Set input SC', or at the Clock input CC' of the reference unit, the flip-flop 32 goes to the "high" position, and the output U delivers a signal ONE on output 31 enabling the NAND gate 21, thus allowing, which may be the case, an alarm signal to be delivered.

The Reset input R of flip-flop 32 is connected to an input 33 by means of which a signal for resetting the flip-flop in the "low" condition may be applied. This, for instance, may be obtained using the same push button 23 which resets the flip-flop 22.

A light signalling device, preferably a solid-state photoemitter 35, connected to the output 31 of the supervision unit, will light up when this output is at binary value ONE, signalling that the sequential unit under test and the reference unit are in the same conditions.

Consider now the case wherein the integrated units 1 and 2 are not provided with common set and clock inputs, each one of the four flip-flops having, instead, a single data input D and a single clock input C. In this case the supervision circuit 40, indicated at FIG. 1a, comprises four flip-flops 41, 42, 43, 44 having their set inputs S connected, through the input leads 45, 46, 47 and 48, to the four individual clock inputs of the reference unit $C'_0$, $C'_1$, $C'_2$, $C'_3$, not shown in the Figure, which are assumed to be connected to the so indicated lead. The outputs U of the four flip-flops are connected to the inputs of an AND gate 50 having the output connected to the output 49 of the supervision circuit, and therefore connected to the second input of the NAND gate 21 as indicated by arrow (21). A common reset input, connected by the lead X to the push button 23 of FIG. 1 may reset all the flip-flops to the "low" position.

Figure 1A:
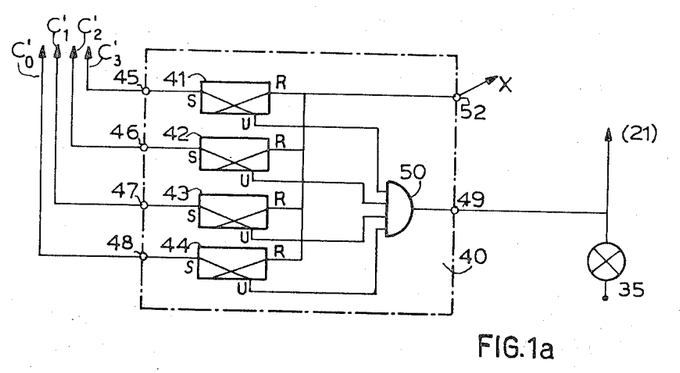
FIG. 1a is a modification of the same wiring diagram in the case where only clock inputs are provided.

In the initial conditions the four flip-flops are in the "low" condition, and deliver a ZERO value at all their outputs. Therefore, output 49 is also at ZERO value, and the error alarm is inhibited. Any time a pair of corresponding flip-flops in the unit under test and in the reference unit are put in the same state in response to a ONE signal on a clock input, the corresponding one of the four flip-flops 41 to 44 is set in the "high" condition, and one of the inputs of the AND gate 50 goes over from ZERO to ONE. When each one of the clock inputs has received at least one clock signal, all flip-flops 41 to 44 have been put in the "high" condition, all the inputs of the AND gate 50 are ONE, and the output 49 is ONE. On the other hand, when this condition is fulfilled, the pattern of the states of the flip-flops in the refernece unit and in the unit under test is the same, provided the unit under test is operating faultlessly. Thus, the inhibition of the alarm signal is removed, and the test may go on. In case the unit under test is faulty, and does not respond as required to the clock and data signals, so that some one of the flip-flops of a pair is not in the same state, as the other one, an alarm will be given as soon as the inhibition is removed.

From the above example it is easily understood how to design the supervision circuit according to the number, type and control means of the flip-flops contained in the unit under test.

Thus, if the flip-flops contained in the sequential units are of the Set-Reset type, in which a ONE signal applied to either one or to the other of the two inputs, sets the flip-flop either in the "high" or in the "low" condition, the supervisor circuit will comprise, for each pair of Set and Reset inputs of the sequential unit, an OR gate with two inputs connected to said Set and Reset inputs, the output of the gate controlling a flip-flop, as the flip-flop 32 of FIG. 1.

Figure 1B:
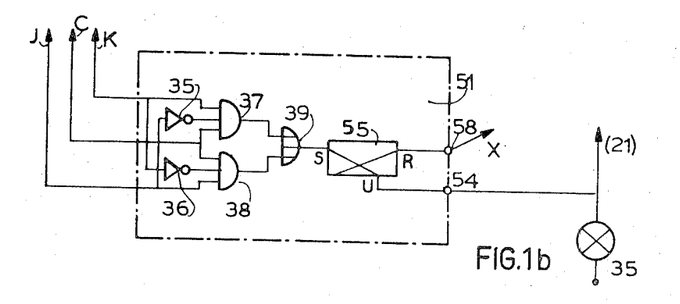
FIG. 1b is a modification of the wiring diagram of FIG. 1 in the case where flip-flops of the J-K type with clock input are employed.

If the flip-flops of the sequential unit are of the J–K clocked type, they are set in a definite position only when, for instance, a ONE signal is applied to one of said inputs, and a ONE signal is applied to the clock input. If a signal ONE is applied to both J and K inputs, the flip-flop is not put in any definite position, because, in this condition, as known, the flip-flop change position at each clock signal. Therefore the logical three-input network, which controls a flip-flop corresponding to flip-flop 32 of FIG. 1, should have the following truth-table:

| J K C U | J K C U |
|---------|---------|
| 0 0 0 0 | 1 0 0 0 |
| 0 0 1 0 | 1 0 1 1 |
| 0 1 0 0 | 1 1 0 0 |
| 0 1 1 1 | 1 1 1 0 | which corresponds to the logical function $U = \overline{JKC} + J\overline{K}C$. The supervision circuit (shown in FIG. 1b) therefore comprises this logical network, including two inverters 35 and 36, two AND gates 37 and 38, and the OR gate 39, having the output connected to the SET input of flip-flop 55, having the output connected to output lead 54 and the reset input connected to input 58.

Figure 2:
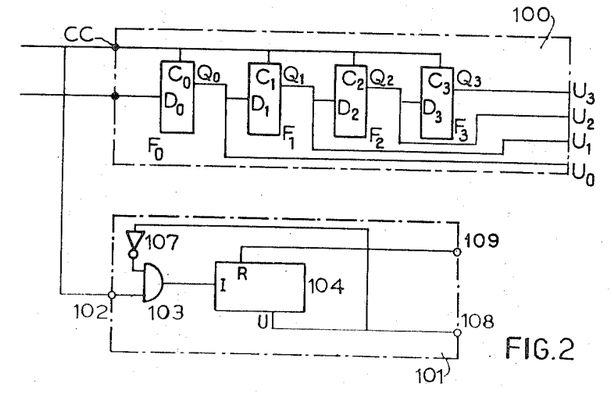
FIG. 2 is a simplified wiring diagram of the device in the case using a shift register.

FIG. 2 illustrates the case wherein the reference sequential unit 100 comprises a shift register, formed by four flip-flops $F_0$, $F_1$, $F_2$, $F_3$ of the "master-slave" type. As known, each flip-flop is provided with an information input D, a clock input C, and an output Q which is connected with the data input D of the following one. The four outputs Q are also connected to four external terminals $U_0 \ldots U_3$. Each "master-slave" flip-flop consists substantially of two flip-flops: a "master" and a "slave", of which the first one is controlled by the rising front of the clock signal, and the second one by the falling front of the same.

The binary value applied to the input D is stored in the first "master" flip-flop in response to the rising front of the clock pulse, the second "slave" flip-flop remaining in the former state. In response to the following falling front of the clock pulse the said binary value is stored in the "slave" flip-flop, and therefore appears at the output Q of the first "master-slave", and is applied to the input D of the second one. At this time, a new information value may be applied to the input I, that is, to the data input $D_0$ of the first master-slave. In response to the following clock rising front, the information applied in $D_0$ is recorded in the first "master", and the one applied to $D_1$ is recorded in the second "master". At the following second falling front of the clock signal, the information proceeds from the first "master" into the first "slave", appears at $Q_0$ and is applied to $D_1$; the one recorded in the second "master" goes into the second "slave", appears at $Q_1$ and is applied to $D_2$.

It is clear that after four subsequent complete alternations of the clock signal the information value present at input I at the moments of the four subsequent rising fronts have been recorded into the four "masters" and that, at the moment of the fourth falling front these values are now recorded in the four "slaves", and appear to the outputs $U_0$ to $U_3$. As, during this operation, the values applied to the input I' of the reference unit have been the same as the ones applied to the input I of the unit under test, and if this unit operates correctly, all previous difference possibly existing between the values recorded in the register has been erased, and the pattern of the binary values existing at the outputs $U_0$ to $U_3$ is the same for both units.

The supervision circuit therefore only has the task of checking whether, from the beginning of the test, there have been at least as many complete alternations of the clock signal as are the master-slave flip-flops contained in the unit under test. In the example considered, (FIG.

2) the supervision circuit is indicated by 101, and comprises an input 102 connected parallel to the clock input CC of the reference unit. It is connected to the first input of an AND gate 103 having its second input connected to the input of an inverter 107, having the input connected to the output 108 of the supervision circuit. The circuit comprises a counter 104 having an output U delivering initially a ZERO value, and on which a value ONE appears when four complete clock signals have been applied to the input I. When this happens, the output of inverter 107 inhibits the AND gate 103 and the counter remains in the caught up state until it is reset to Zero by a signal applied to the reset input R connected to input terminal 109. Therefore this supervision circuit will remove the inhibition of the alarm signal when the register under test and the reference register have been loaded with the same data.

Figure 3:
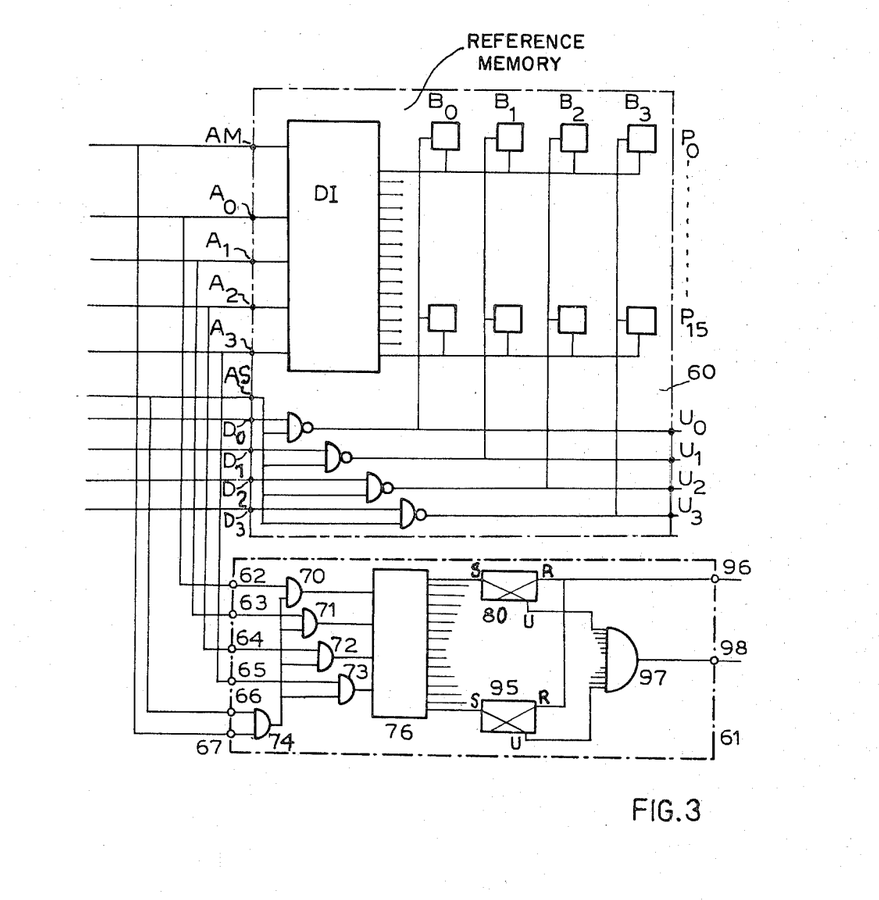
FIG. 3 is a simplified wiring diagram of the device in the case employing a semiconductor storage unit.

FIG. 3 considers the more complex case of a semiconductor memory contained in an integrated unit, indicated as a whole by reference numeral 60, and represents only the reference unit. It contains 16 words $P_0$ to $P_{15}$, having four bits B0 to B3 each, and is provided with the following inputs:

a memory enabling input AM, four address inputs $A_0$ to $A_3$, a write enable input AS, four data inputs $D_0$ to $D_3$, and four outputs $U_0$ to $U_3$.

When input AM is at the value ONE, the memory is enabled, and an address of four bits may be applied to the four address inputs $A_0$ to $A_3$ for selecting one out of 16 words. If the write-enable input AS is ZERO, the values recorded in the four storage cells of the selected word appear at the outputs $U_0$ to $U_3$.

When the writing is enabled (AS to ONE) the four data bits applied to the inputs $D_0$ to $D_3$ are written in the four storage cells of the selected word. The description of other devices and operations proper to semiconductor memories is omitted as they are not relevant for an understanding of the present invention. When the reference memory unit is connected by the gripper to the unit under test, each time a pattern of four bits is applied to the address inputs of the two units, while the memory enabling input and the write-enable input are at value ONE, the bits applied to the four data inputs are recorded in the selected word, both in the unit under test as in the reference unit, if the former operates correctly: and from this moment on the four storage cells of this word in both units will record the same bits, being subject to the same signals.

To be sure that the unit under test and the reference unit are in the same state, it is required that all 16 bit patterns, which address all 16 words, have been applied at least one time to the four address inputs, the enabling inputs being both at level one.

In FIG. 3 the supervision circuit is indicated, as a whole, by reference numeral 61. It comprises four inputs 62, 63, 64, and 65 connected in parallel to the address inputs $A_0$, $A_1$, $A_2$, $A_3$ and two inputs 66 and 67 connected respectively to the memory enable input AM and to the write-enable input AS. Each one of the inputs 62 to 65 is connected to the first input of four AND gates 70, 71, 72, 73, having their second inputs parallel connected to the output of an AND gate 74 having its two inputs connected to the inputs 66 and 67 of the supervision circuit, that is, to the AM and AS enabling inputs.

When AM and AS are both at the value ONE, that is, the memory and the writing are enabled, the output of AND gate 74 enables the AND gates 70 to 73 to transmit the signals applied to their first inputs. The output of these AND gates are applied to the inputs of a four-input, 16-outputs decoder 76. Each output is applied to a Set input of one of 16 flip-flops 80 to 95, of which only the first and last are shown in the figure, having their output U connected to the inputs of a 16-input AND gate 97. The output of this gate 97 is connected to the outputs 98 of the supervision circuit 90, and this output, as already explained, may enable the test circuit to deliver the alarm signal, if its output is at level ONE. This happens when all flip-flops 80 to 95 have been set in the "high" condition, that is when they have received at least one ONE value at their set input. This happens only when all the 16 possible patterns of addressing bits have been applied at least one time to the four inputs 62 to 65, with inputs 66 and 67 at value ONE.

The 16 flip-flops 80 to 85 may be reset in the "low" position by a reset signal applied to input 96, which controls all the reset inputs of the flip-flops.

It may happen that some of the 16 words of the storage units are not used, and therefore, the running program, during the test operation, may not apply the corresponding address to the address inputs. In this case, according to the conditions, a ONE signal may be applied by suitable means to the inputs of AND gate 97, which are not used, or either, the program used must be designed for delivering the addresses even of the words not in use. These examples quickly consider all the types and modes of application of integrated sequential circuital units. There is, however, a peculiar case, rather uncommon, in which no one of the above mentioned circuits and modes of operation may be suitable, and in this case the supervision circuit must be based on a rather different principle.

This is the case of a cyclical sequential circuit not provided with a reset input. A circuit of this type, when driven by a series of clock pulses, goes through the different states forming a closed loop, and therefore delivers at its outputs a sequence of patterns of binary values which is repeated after a definite number of clock pulses. It may happen that, during the test of a circuit of this type, the reference unit connected in parallel to its terminals is not in the same state as the unit under test, and therefore delivers at its outputs, at the same steps, a pattern of binary values different from the ones delivered by the unit under test. If the unit is provided with a reset input, the difficulty is easily overcome, as the supervision unit will enable the alarm signal only after a reset signal has been received by both units.

Figure 4:
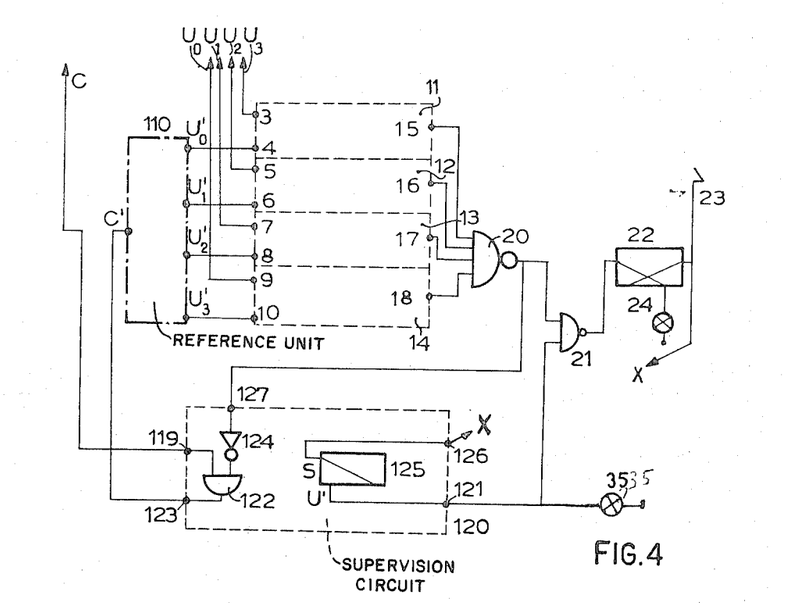
FIG. 4 is a wiring diagram of a modified device according to the invention in the case where a sequential cyclic unit is not provided with reset input.

In the case which is practically not common, that no reset input is available, the unit under test and the reference unit will go on along the same cycle in response to the same clock pulses, but if they are initially out-of-step, there is no means of setting them in step, that is, at the same state of the cycle, and, even if they operate correctly, there will be differences in binary values at the corresponding outputs, and therefore an alarm signal will take place. FIG. 4 shows how it is possible to solve this difficulty.

The sequential cyclical reference unit is indicated by 110, and is provided with a clock input C' and four outputs $U'_0$, $U'_1$, $U'_2$, $U'_3$, connected to the four second inputs of the logical test channels 11, 12, 13, 14, having connected at their first inputs, the outputs $U_0$, $U_1$, $U_2$, $U_3$ of the unit under test, not shown.

The outputs 15, 16, 17, 18 of the test channels are connected to the inputs of the NAND gate 20; as in FIG. 1, the same reference numbers indicate the NAND gate 21 for inhibiting the alarm signal, the flip-flop 22, the signalling lamp 24 and the reset push button 23. It must be remembered that, in the preferred embodiment of the invention, as described in the cited copending application, and as assumed to be embodied in the examined example, the output of the NAND gate 20 delivers a binary ONE in case of discordance between the values of the two inputs of at least a test channel having a duration higher than a predetermined value.

The supervision circuit 120 is provided with a clock input 119 connected to the wire leading, by means of the known gripper device, to the input C of the unit under test, and comprises an AND gate 122 having a first input connected to this clock input 119, the output connected to a clock output 123, leading in turn to the input C' of the reference unit. Therefore the reception of the clock pulses by the reference unit may be inhibited by the AND gate 122 by means of its second input connected, through the inverter 124 and terminal 127 to the output of NAND gate 20. The supervision circuit comprises in addition a one-shot circuit 125, which is set in the "high" position at the beginning of the test, by a signal applied to input terminal 126, and sent by the reset push button 23. In the "high" position the inverted output U' of the one shot 125 delivers a ZERO value to the output terminal 121, inhibiting the alarm signal.

Figure 5:
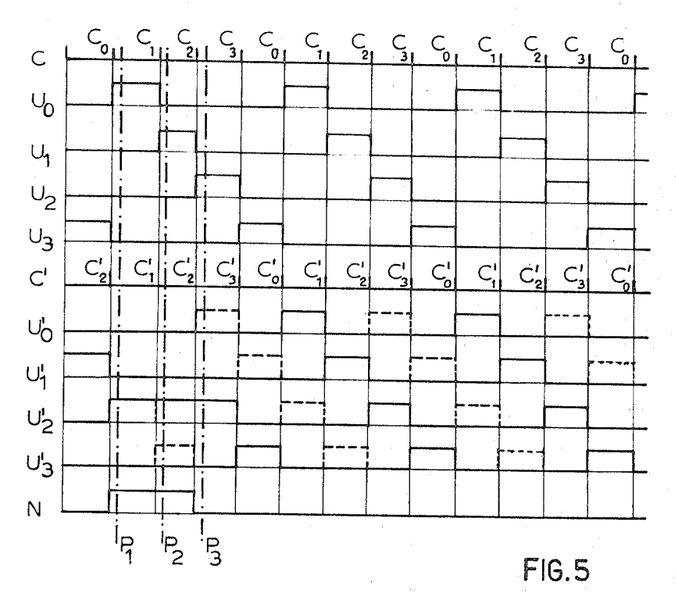
FIG. 5 shows a plurality of waveform diagrams at different points of the device of FIG. 4.

FIG. 5 shows the diagrams of the binary values at different points of the circuit. It is assumed, for instance, that the cyclical unit is such as to let a ONE value appear at each pulse, and for the interval separating two subsequent pulses, at each one on the output $U_0$, $U_1$, $U_2$, $U_3$ in orderly succession.

The diagram shows the sequent of the clock pulses $C_0$, $C_1$, $C_2$, $C_3$ repeated three times. The diagrams $U_0$, $U_1$, $U_2$, $U_3$ show the sequence of the binary values at the outputs of the unit under test. Diagram C' shows the sequence of the clock pulses effectively applied to the input C' of the reference unit, and the diagrams $U'_0$, $U'_1$, $U'_2$, $U'_3$, show, in solid line the effective sequences of the binary values at the corresponding outputs of the reference unit. The diagram N shows the succession of binary values at the output of the NAND gate 20.

It is assumed that initially the reference unit is out-of-step with respect to the unit under test, by two steps: that is, that, while for the latter the first clock pulse is $C_0$ (which causes the output $U_0$ to go to ONE, and the output $U_3$ to go to ZERO), the other outputs remaining at ZERO for the reference unit this pulse acts as pulse $C'_2$, (which brings to ONE output $U_2$ and to ZERO output $U_1$ the other outputs remaining at ZERO). The dashed lines represent the pulses in case all the clock pulses were received by the reference unit, and the two units would proceed out of step.

As soon as the first clock pulse is received, the outputs assume the values to be read in correspondence with the vertical line $P_1$: there is discordance of values between $U_0$ and $U'_0$ and between $U_2$ and $U'_2$: therefore the output of NAND gate 20 goes to ONE and the gate 122 is inhibited.

At the following clock pulse $C'_1$ the output of NAND gate 20, by effect of the delay introduced by the delay lines of the test channels, is still at ONE, therefore this clock pulse is not received by the reference unit, which remains in the former state, whereas the unit under test goes to the following state.

In this condition, the binary values of the outputs may be read in correspondance of the vertical line $P_2$: there is discordance between $U_1$ and $U'_1$, $U_2$ and $U'_2$. Therefore, as the unit under test receives the clock pulse $C_2$, the reference unit does not receive any pulse, and remains in the former state. In this condition, as may be seen along the line $P_3$, there is agreement of values on all outputs. The output of NAND gate 20 returns to ZERO, the AND gate 122 is enabled, and the subsequent pulse $C_3$ is received also by the reference unit as pulse $C'_3$, because it follows $C'_2$. The two units are now in step and may proceed so along the cycle. Thus, by preventing the reception of clock pulses by the reference unit, and letting it lose some steps, the difference in steps is removed, and the two units are brought in step.

During this process, the alarm signal is inhibited, because the one-shot is in the "high" position.

It is not suitable to enable the alarm signal immediately after the first agreement between all corresponding outputs of the cyclic units, because the simple agreement at one or two steps is not enough to guarantee that both units are in step.

A defective operation of the unit under test may cause a perturbation of the cycle of the unit under test, thus preventing the falling in step of the units, and causing the periodical or erratical appearance of discordances. However, even if the unit goes along the correct cycle, a faulty output may periodically deliver a wrong value and cause a discordance to appear. This causes an error signal to be delivered by NAND gate 20, which disturbs the stepping of the reference unit.

In any case, it is self-evident that every fault will prevent the falling in step of the two units, whereas, by the operation on the described supervision circuit, two correctly operating units will fall in step after a certain time. Therefore, the one-shot 122 may return to the "low" position after a reasonable length of time, delivering a ONE value to output 127 and enabling the alarm signal. If the unit under test is operating correctly, by this time both units will be in step, the corresponding outputs will be in agreement, and no alarm signal will be generated. In the contrary case, the emission of an alarm signal will reveal, with practical certainty, that the unit under test is faulty.

It has been found that, even in the most unfavorable case, both units, if they operate correctly, will fall into step after a number of cycles of the tested unit not greater than the number of steps per cycle. The time after which the one-shot may return to the "low" condition may be thus established substantially as the time corresponding to a number of pulses equal to the square of the number of steps per cycle. For instance, in the case where the cycle comprises 128 steps, each step during two microseconds, the time corresponding to $128 \times 2$ cycles is approximately 32 ms, which is clearly admissible.

In special cases, when the interval between subsequent clocks is considerable, and the number of steps is very high, this rule could lead to a return time of the one shot which is too long for practical requirements.

However, it is usually possible, by analyzing the cycle of the sequence of signals at the outputs of the cyclical unit, to establish the maximum number of clock pulses which are required to put both units in step. It has been found that, on the average, this does not exceed the number of clock pulses equal to twice the number of steps per cycle.

Figures 4A, 6:
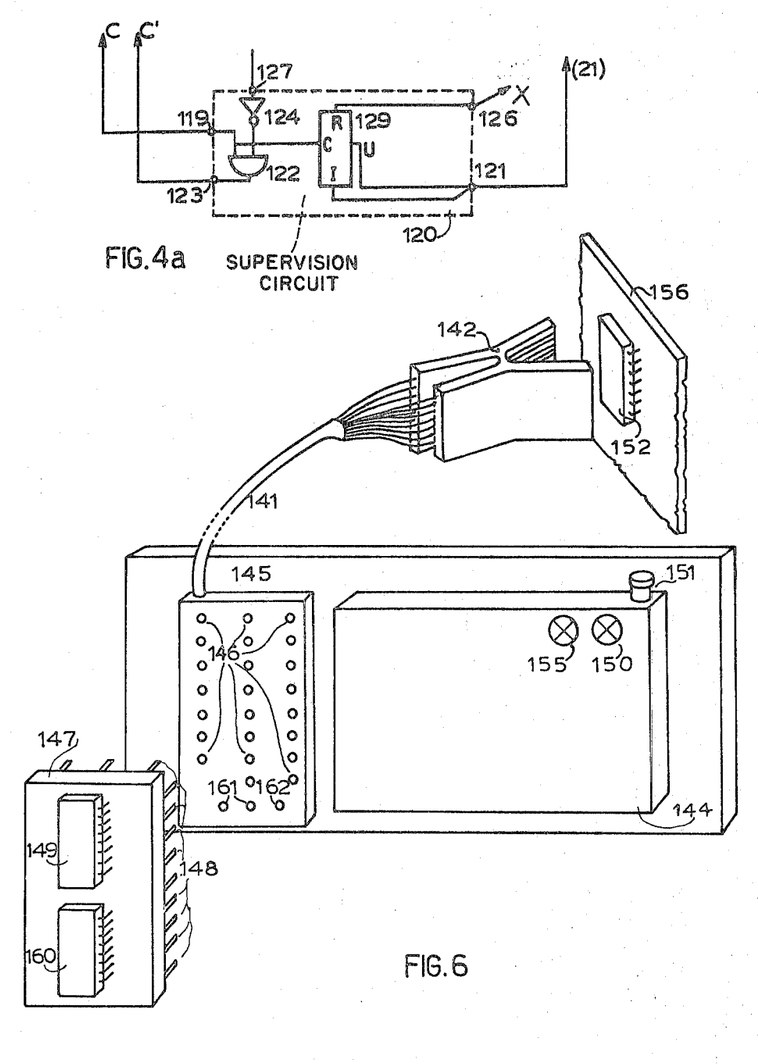
FIG. 4a is a variant of the preceding circuit.
FIG. 6 is a schematic perspective view showing the arrangement of the different components according to a preferred embodiment.

In this case, as shown by FIG. 4a, the suprvision circuit may comprise, in place of the one-shot, a counter 129 driven by the clock input 119. This counter will give the value ONE at the output 121 only after receiving the predetermined number of clock pulses, thus enabling the alarm signal, and will be maintained in this condition by an inhibiting input I controlled by the ONE signal on the output 121. The counter may be reset to zero by a reset pulse applied to input 128.

It may happen that a cyclical sequential circuit goes along a cycle which does not comprise all possible states of the circuit: in this case the unit under test, and the reference unit, even if identical, may, in case of an accidental difference between their respective starting position, go along different cycles and therefore never fall in step. In this case, the test device will signal this condition as a fault, emitting the alarm signal. However, it is evident that, if this is the case, the apparatus including such cyclical sequential unit could not operate correctly if the unit is not provided with a reset input to establish without doubt the starting position and the cycle to follow.

A particularly simple case of cyclical sequential until is the switching flip-flop, that is, a flip-flop which changes state at each clock pulse, as a J-K flip-flop having both inputs at ONE. In this case the one-shot 125 should have a return time not lower than two clock intervals.

FIG. 6 shows schematically a possible embodiment of the invention corresponding substantially to FIG. 6 of the cited copending application. It shows the testing apparatus comprising a gripper 142 which may be applied to the circuit unit 152 to contact its pins, and the wires of the flexible cord 141. Reference number 44 indicates the container of the test channels, which is provided, in addition to other components which are irrelevant to this description, with a reset push button 151, an alarm lamp 150 for signalling a fault, and a lamp 155 for signalling the enabling of the alarm signal.

There is, in addition, a socket 145 provided with plugs 146, 161 and 162, wherein a pin support 147 may be plugged. The pin support 147 carries, in addition to the reference sequential unit 149, also the supervision circuit 160 associated with this unit, which will be conveniently obtained in form of an integrated unit, and contained in a package of the same standard type as the reference unit. When the type of sequential unit under test is changed, and therefore the pin support carrying the reference unit is also changed, the supervision circuit suitable for such sequential unit type is at the same time also automatically provided.

It may be seen that, in the great majority of cases of sequential units, two additional pins, and two additional plugs 161 as those needed for purely combinatorial units must be used: that is the pin — and plug — and the plug for the output of the supervision circuit and the pin — and — plug for the input of the reset signal. Only in the case of cyclical units, as considered in FIGS. 4 and 4a, a third pin — and — plug connection is required, for the input of the error signal delivered by the NAND gate 21.

What is claimed is:

1. An improved test device for electronic circuit units, having a plurality of input and output leads, and mounted on digital electronic apparatus, comprising a reference circuit unit similar to the circuit unit under test, at least a comparator circuit having two input and one output leads, means for temporarily and singularly connecting each input lead of a circuit unit under test to the corresponding lead of the reference circuit unit, and for connecting at least one output lead of said circuit unit under test to a first input lead of said comparator circuit; means for connecting the corresponding output lead of the reference circuit unit to the second input lead of said comparator circuit, the comparator circuit delivering a discordance signal whenever two signals of different binary level are applied to the input leads of said comparator circuit; timing means for transmitting only the discordance signals exceeding a predetermined time interval; means for memorizing the transmitted discordance signal, and means controlled by said memorizing means, for emitting an alarm signal, the improvement comprising a supervision circuit having input leads for receiving at least part of the signals applied to the input leads of the unit under test, and means for inhibiting the memorizing of said dicordance signal under control of signals delivered by said supervision circuit, said supervision circuit disabling said inhibiting means when the reference unit has received all signals needed for setting all memory elements comprised therein in the same state as the memory elements comprised in the unit under test in case of correct operation of the unit under test in response to the received signals.

2. An improved test device as claimed in claim 1 wherein said signals received by said supervision circuit are at least part of the signals applied to the circuit unit under test for controlling the memory elements comprised therein.

3. An improved test device as claimed in claim 2, wherein said supervision circuit comprises memory elements controlled by at least part of said signals applied to the circuit unit under test for controlling the memory elements comprised therein.

4. An improved test device as claimed in claim 2, wherein the signals applied to the reference unit for controlling the memory elements comprised therein are under the control of said supervision unit, said supervision unit being able to inhibit the receiving of at least part of said signals under control of the discordance signal, for modifying the progression of the set of memory elements of the reference unit along a succession of state combinations, for reaching a condition whereby the set of memory elements contained in the unit under test and the set of memory elements contained in the reference unit are in the same combination of states.

5. An improved signal device as claimed in claim 4, wherein the inhibiting of the memorizing of the discordance signal is disabled by the supervision unit after a predetermined time interval from the beginning of the test of the unit under test.

* * * * *